Patented Apr. 15, 1924.

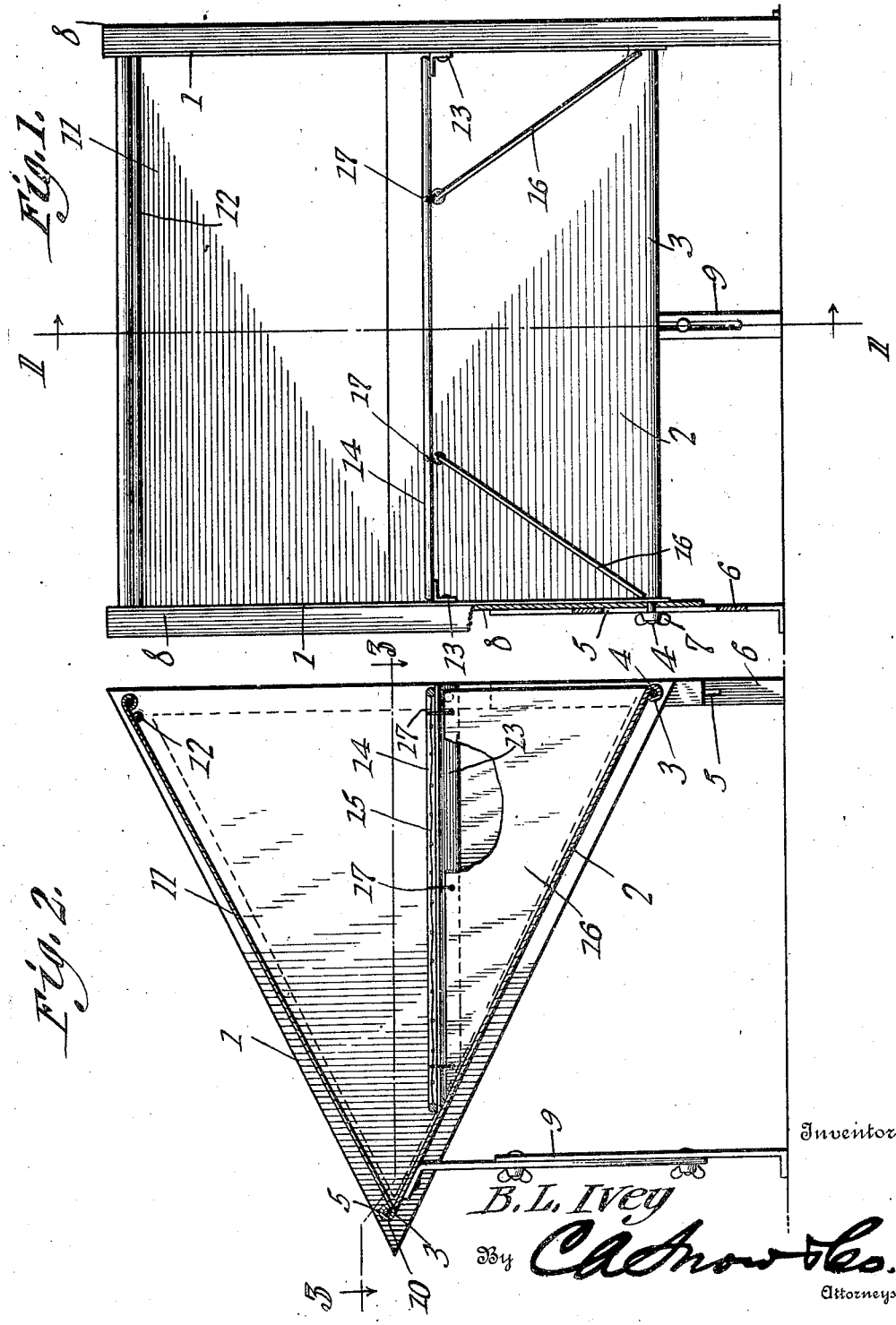
April 15, 1924.
B. L. IVEY
COOKER ATTACHMENT FOR FIREPLACES
Filed Oct. 18, 1923    2 Sheets-Sheet 1
1,490,274
Inventor
B. L. Ivey
By *C. A. Snow & Co.*
Attorneys

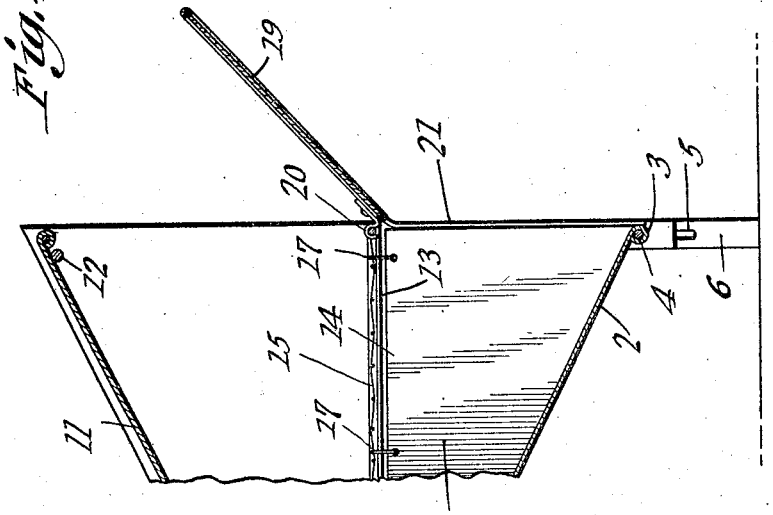
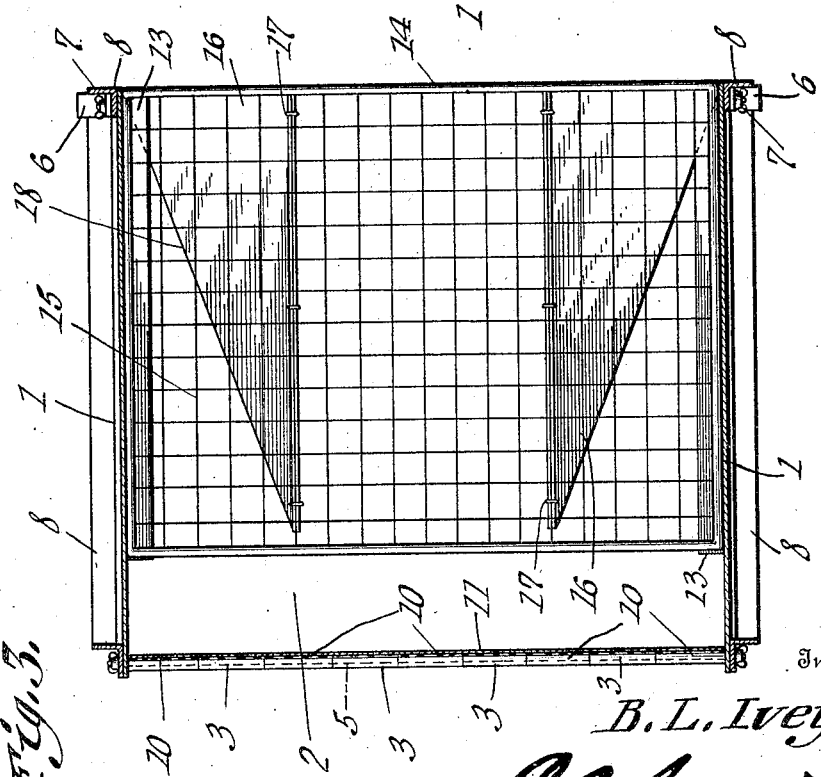

1,490,274

UNITED STATES PATENT OFFICE.

BENJAMIN LODRICK IVEY, OF ROCK HILL, SOUTH CAROLINA.

COOKER ATTACHMENT FOR FIREPLACES.

Application filed October 18, 1923. Serial No. 669,348.

*To all whom it may concern:*

Be it known that I, BENJAMIN L. IVEY, a citizen of the United States, residing at Rock Hill, in the county of York and State of South Carolina, have invented a new and useful Cooker Attachment for Fireplaces, of which the following is a specification.

This invention relates to a cooking attachment for open fireplaces, one of its objects being to provide a compact, light and durable device of this character which, when set up in front of a fireplace will utilize both direct and reflected heat rays for frying, broiling, baking and roasting food placed in the cooker.

Another object is to provide means for controlling the action of the heat rays, it being possible to concentrate the rays in the lower portion of the cooker when it is desired to fry food contained in the upper portion of the device, and to direct the heat rays into all portions of the cooker when it is desired, for example, to bake or roast the food.

A further obect is to provide the cooker with means whereby steam and vapor can pass off freely during the process of frying, broiling or boiling food.

With the foregoing and other objects in view which will appear as the description proceeds, the invention consists of certain novel details of construction and combinations of parts which will be hereinafter more fully described and pointed out in the claims, it being understood that changes may be made in the construction and arrangement of parts without departing from the spirit of the invention claimed.

In the accompanying drawings the preferred form of the invention has been shown.

In said drawings,

Figure 1 is a front elevation of the cooker.

Figure 2 is a section on line 2—2 Figure 1, a portion of one of the deflectors being broken away.

Figure 3 is a section on line 3—3 Figure 2.

Figure 4 is a vertical section through the open or front portion of the cooker and showing thereon a deflecting attachment for use when frying or boiling food.

Referring to the figures by characters of reference 1 designates triangular side plates connected, near their lower edges, by a bottom plate 2 the upper surface of which is polished so as to constitute an efficient reflector of heat rays. The ends of this plate 2 are rounded to form transverse beads 3 through which are extended rods 4 and 5 respectively. The ends of the rod 4 are extended through longitudinal slots 5 formed in legs 6 and these legs can be clamped or held against movement by wing nuts 7 engaging the ends of the rods. Each side plate is preferably reinforced by angle strips 8 extending along the edges thereof and the legs 6 are adapted to be clamped against certain of these strips as shown particularly in Figure 1. A longitudinally adjustable leg 9 is attached to the bottom plate 2 near the upper end thereof and it will be obvious that by adjusting legs 6 and 9 the cooker can be supported at any desired elevation in order to be properly positioned relative to an open fireplace.

Pivotally mounted on the rod 5 between the beads 3 are sleeves 10 provided at one end of a top plate 11. This top plate is normally supported substantially parallel with but below the upper edges of the side plates 1 and is adapted to be mounted at its front end on a supporting rod 12 connecting the side plates. The bottom surface of the top plate is highly polished so as to constitute an efficient reflector of heat rays.

Secured to the inner faces of the side plates 1 are supporting cleats 13 substantially horizontal and constituting supports for a removable shelf 14. As shown this shelf can be provided with a coarse open mesh screen body 15 so that heated air can circulate through it readily.

Triangular deflecting plates 16 are adapted to be inserted between shelf 14 and the bottom plate 2. These plates have hooks 17 pivotally connected to them and adapted to engage the shelf 14 at any suitable points. Thus the deflecting plates can be arranged at any angles desired and if placed with their upper edges parallel with the sides of the shelf 14, the lower edges of the deflecting plates will be positioned diagonally upon the bottom plate 2 as shown at 18 in Figure 3.

For ordinary baking or roasting the deflecting plates 16 can be removed and after the food has been placed on the shelf 14 the hinged top plate 11 can be lowered to the position shown in the drawings. As the cooker is located close to an open fireplace the heat from the burning fuel will be deflected upwardly by the bottom plate 2 and downwardly by the top plate 11. The amount of downward deflection of heat can be regulated by partly raising the top plate 11. Should it be desired to concentrate the heat rays beneath the article being cooked the deflecting plates 16 should be positioned under the shelf 14 as shown. Thus the heat rays will flow upwardly through a restricted space, those rays reflected by the side portions of the plate 2 being deflected toward the center of the cooker by the plates 16.

When it is desired to fry or boil food on the shelf 14 a heat deflecting plate 19 is used as shown in Figure 4. This plate has hooks 20 adjacent one edge adapted to engage the front portion of the shelf 14. One or more arms 21 are extended at an angle from the shelf and are adapted to bear against the front edge of the bottom plate 2, so as to support plate 19 in a forwardly and upwardly inclined position. The top plate 11 can be raised and the heat rays will be concentrated under the food on the shelf so as quickly to fry or boil it as intended. Plate 19 serves to deflect the heat rays downwardly where they will be concentrated between the bottom plate 2 and the deflecting plates 16. Plate 19 also prevents the heat from passing directly from the fireplace into the upper portion of the cooker.

What is claimed is:

1. A cooker attachment for open fireplaces comprising side plates, forwardly diverging top and bottom plates having inner reflecting surfaces, the front of the attachment being open, a foraminous shelf supported between the top and bottom plates, and angularly disposed deflecting plates interposed between the shelf and the bottom plate.

2. A cooker attachment for open fireplaces open at its front end and having top and bottom plates diverging toward said end, said plates having inner heat reflecting surfaces, angularly disposed heat deflecting plates interposed between said plates, and a foraminous shelf between the top and bottom plates.

3. A cooker attachment for open fireplaces open at its front end and including side plates, a bottom plate connecting the side plates, an angularly adjustable top plate, the top and bottom plates diverging toward the open front of the attachment, a foraminous shelf between the plates, and heat deflecting plates interposed between the shelf and the bottom plate.

4. A cooker attachment for open fireplaces open at its front end and including side plates, a bottom plate connecting the side plates, an angularly adjustable top plate, the top and bottom plates diverging toward the open front of the attachment, a foraminous shelf between the plates, heat deflecting plates interposed between the shelf and the bottom plate, and means detachably engaging the shelf for adjustably supporting the heat deflecting plates.

5. A cooker attachment for open fireplaces open at its front end and including side plates, a bottom plate connecting the side plates, an angularly adjustable top plate, the top and bottom plates diverging toward the open front of the attachment, a foraminous shelf between the plates, heat deflecting plates interposed between the shelf and the bottom plate, a deflecting plate detachably connected to the shelf and inclined upwardly and outwardly therefrom, and means extending from said plate and cooperating with a part of the attachment for supporting said plate in its inclined position.

In testimony that I claim the foregoing as my own, I have hereto affixed my signature in the presence of a witness.

BENJAMIN LODRICK IVEY.

Witness:
E. W. EDWARDS.